United States Patent [19]

Hontgas et al.

[11] 4,137,849

[45] Feb. 6, 1979

[54] ENDOTHERMIC APPROACH FOR DESENSITIZING EXPLOSIVE ORDNANCE

[75] Inventors: Christopher P. Hontgas, King George; Benjamin D. Smith, Dahlgren, both of Va.

[73] Assignee: The United States of America as represented by the Secretary of the Navy, Washington, D.C.

[21] Appl. No.: 844,688

[22] Filed: Oct. 25, 1977

[51] Int. Cl.² .............................................. F42B 37/00
[52] U.S. Cl. ........................... 102/56 R; 102/DIG. 8; 149/19.91
[58] Field of Search ..................... 102/56 R, 103, 105, 102/DIG. 8; 149/19.91

[56] References Cited

U.S. PATENT DOCUMENTS

| | | | |
|---|---|---|---|
| 2,771,351 | 11/1956 | Holmes et al. | 102/103 |
| 3,054,253 | 9/1962 | Chung | 102/103 |
| 3,636,881 | 1/1972 | Godfrey | 102/103 |
| 3,726,829 | 4/1973 | Sayles | 102/103 |
| 3,749,024 | 7/1973 | Pakulak, Jr. | 102/56 R |
| 3,774,541 | 11/1973 | Bratton | 102/27 R |
| 3,992,997 | 11/1976 | McCubbin et al. | 102/56 R |
| 4,011,818 | 3/1977 | Stosz, Jr. | 102/56 R |

*Primary Examiner*—Verlin R. Pendegrass
*Attorney, Agent, or Firm*—R. S. Sciascia; A. L. Branning; H. B. Field

[57] ABSTRACT

Desensitization of explosive ordnance is effected by the incorporation of a desensitizing agent into a matrix support material to form a bomb liner. The matrix support material holds the desensitizer in place, provides a barrier between the explosive and the metal casing, and controllably releases the desensitizing agent as the temperature of the explosive ordnance nears the rapid decomposition temperature.

5 Claims, No Drawings

ENDOTHERMIC APPROACH FOR DESENSITIZING EXPLOSIVE ORDNANCE

BACKGROUND OF THE INVENTION

This invention relates to bomb liners, and more particularly to bomb liners which contain a matrix support material and a desensitizing agent capable of diluting and endothermically reacting with the explosive in a bomb.

Disasters aboard the USS Forrestal and the USS Enterprise cost the United States heavily in both men and equipment. These disasters were caused by and were prolonged by ordance being exposed to jet fuel fire and/or the exhaust from a jet engine starter impinging on a warhead. When ordnance items are exposed to heat generated by fires, the explosive reaches a critical temperature, approximately 500° F. (260° C.) for formulations containing RDX and TNT, at which the explosive undergoes a rapid, exothermic decomposition. In the confines of ordnance, the decomposition reaction quickly progresses from deflagration to detonation. If engulfed in a JP-5 fire, unprotected, heavy steel-walled MK 80 series bombs detonate in as little as 115 seconds. The time to destruction has been extended to approximately 9 minutes by using an exterior intumescent paint and thickened asphaltic hot melt. This is not an ideal solution because the paint sloughs off in handling and does not comply with dimensional tolerances.

Historically, asphaltic hot melt has been used to coat the interior of ordnance items to protect the explosive load from the cracks and rust of the metal shell. Typical asphaltic hot melt mixtures soften at 200° to 235° F. (93° to 113° C.) and are liquid and pourable into the bomb shell at 430° F. (221° C.). Mass spectrometric analysis identifies the asphaltic hot melt as principally aliphatic hydrocarbons with minor quantities of aromatic compounds with aliphatic side chains. Some unsaturated carbon-carbon double bonds are found in the aliphatic hydrocarbons and side chains. The average chain length in the aliphatic fraction is 26 carbon atoms, and the average chain length of the aliphatic side chain on the aromatic compounds is 11 carbon atoms. Since the asphaltic hot melt is a mixture of compounds of varying chain lengths and structure, both the molten and solidified asphaltic hot melt are pliable and cracking is not observed when the molten asphaltic hot melt solidifies. The cold metal of the warhead case causes the hot melt to gell, coating the interior of the metal shell, and then the excess hot melt is poured out. A uniform coating of approximately 1/16- to ⅛-in. thickness is achieved.

Typical RDX-TNT based explosives, such as H-6, melt at 178° F. (81° C.) and are poured into the ordnance shell at 200° F. (93° C.). When bombs loaded with H/6 and lined with asphaltic hot melt liner are engulfed in a JP-5 fire, a reaction can occur within as little as 115 seconds. This allows very little time for any form of firefighting procedures. Research conducted to characterize ordnance items in a fire shows that the average temperature of the asphaltic hot melt-explosive interface at the time of the warhead self destruction is approximately 500° F.

When ordnance items are explosed to a fire, the temperature of the liner-explosive interface is raised until it reaches a temperature of 500° F. (260° C.), at which the explosive undergoes a rapid exothermic irreversible decomposition. By a combination of physical and chemical phenomena, the liner material of the present invention extend the time it takes for the explosive to reach the temperature at which the self-sustaining, irreversible, exothermic decomposition occurs. Ordnance items can be caused to react violently (cook off) if they are totally engulfed in flames which produce a very high, evenly distributed heat flux or if they are removed some distance from the flames so that an uneven heat flux results. Regardless of the magnitude or evenness of the heat flux, desirable properties for the liner materials are (a) no interaction with the explosive below 350° F. (177° C.), (b) substantial absorption of heat (an endothermic process) between 305° and 400° F. (177° and 204° C.), and (c) thermal release of the desensitizing agent between 400° and 500° F. (204° and 260° C.). A combination of thermogravimetric analysis (TGA), differential scanning calorimetry (DSC), and small-scale-bomb cookoff tests have been used to screen, evaluate, and characterize potential materials with respect to the above requirements. The most preferred formulation, 65% DENFLEX and 35% s-trithiane, gave a small-bomb cookoff time of 9 minutes, 11 seconds for a 0.25-in. interior liner. This cookoff time is a marked improvement over the cookoff time of 2 minutes, 25 seconds for a 100% asphaltic hot-melt liner of the same thickness.

When TNT and/or RDX-based explosives, such as H-6, reach a temperature of 392° to 482° F. (200° to 250° C.), they will undergo a rapid, exothermic decomposition causing warheads loaded with such explosives to cookoff. Once the rapid, exothermic decomposition begins, the explosive charge becomes a heat source releasing large quantities of energy. The heats of explosion and combustion for H-6 explosive are 923 and 3,972 cal/g respectively. It follows that deflagrating explosive released to burn in the atmosphere provides a fourfold increase in the energy released. A mathematical analysis and laboratory evaluations of various commercial liner materials have indicated that the most expedient solutions to the cookoff problem are (a) to use an inert liner of low thermal conductivity and (b) to increase the thickness of the liner material. Dispersing chemical inhibitors throughout the explosive load is not a viable solution because the inhibitor must reduce the rate of heat release from the explosive load by many orders of magnitude in order to effectively extend the time to cookoff and because the quantity of inhibitor required would drastically dilute the explosive. The present approach avoids these difficulties by using a thick, 0.25-inch liner, which is compounded of material selected for an optimum melt endotherm and which contains a chemical inhibitor in relatively high concentration accessible to the interface of the liner and explosive charge.

SUMMARY OF THE INVENTION

Accordingly, there is provided by the present invention a bomb liner intermidiate a bomb case and an explosive. The subject bomb liner is compatable with the subject explosive and comprises a matrix support material compatible and admixed with a desensitizing agent.

OBJECTS OF THE INVENTION

Therefore, it is an objective of the present invention to provide an interior bomb liner capable of increasing the time it takes for an explosive to reach the temperature at which selfsustaining, irreversible exothermic decomposition occurs.

Another objective of the present invention is to increase the time it takes for an explosive to reach the temperature at which self-sustaining, ineversible exothermic decomposition to a minimum of 9 minutes.

Still a further objective of the present invention is to provide a bomb liner which is compatible with the H-6 explosive.

Yet a further object of the present invention is to provide a desensitizing agent capable of endothermically reacting with and/or diluting the bomb explosive.

Still another object of the present invention is to provide a matrix support material capable of controllably releasing the desensitizing agent.

Other objects and many of the attendant advantages of this invention will be readily appreciated as the same becomes better understood by reference to the following detailed description.

NOMENCLATURE

| Material | Supplier | Description |
|---|---|---|
| Acrawax | C. Glyco Chem. Inc. | Stearic-type polyamide, melting point (MP) 446° F |
| AFX-108 | Eglin Air Force Base | Plastic-bonded explosive whose binder outgases |
| Amprol 23 | Arco Chem. Co. | Microcrystalline wax, MP 175° F |
| Arkron P-115 | Arakawa Forrest Chem. Ind., Ltd. | Proprietary synthetic wax, MP 221° F. Acid value, 0, * with excellent heat resistance and low oxygen-absorption properties, incompatible with nitrocellulose |
| Armoslip CP | Armour Ind. Chem. Co. | Wax-like material principally 9-octadecanamide, MP 162° F, iodine value 80-90, flash point 410° F |
| Asphaltic Hot Melt | Mil-C-3301 | Aliphatic and aromatic hydrocarbon mixture, MP 199° F |
| 4,4'-Azodiphenetole | | $CH_3OC_6H_4NNC_6H_4OCH_3$, MP 320° F |
| 4,4'-Azobis (N,N'-dimethy laniline) | | $(CH_3)_2NC_6H_4NNC_6H_4N_4(CH_3)_2$, MP 280° F |
| CAO 44 | Ashland Chem. Co. | Antioxidant |
| Carnaba Wax | International Wax Refining Co., Inc. | Natural-product wax obtained from the leaves of an American genus of plants (Copernicia cerifera), MP 200° F, acid number 8, iodine number 7-14, saponification value 79-95. |
| CARSTAB DLTDP | Cincinnati Milacron Chemicals, Inc. | Dilaurylthiodipropionate, $S(CH_2CH_2CO_2(C_{12}H_{25}))$, MP 108° F |
| CARSTAB DMTDP | Cincinnati Milacron Chemicals, Inc. | Dimyristylthiodipropionate, $S(CH_3CH_2CO_2(C_{14}H_{29}))_2$, MP acid value 0.4 |
| Ozokerite Wax | International Wax Refining Co., Inc. | Natural-earth wax, MP 185° F, acid number 0.0, saponification value 0.0 |
| Pentalyn C | Hercules | Natural-product resin |
| PETN | | Pentaerythritol tetranitrate |
| Polyethylene Wax | International Wax Refining, Co., Inc. | $H(CH_2CH_2)_xH$, MP 197° F, acid number 0.0, saponification value 0.0 |
| Polymekon Wax | Warwick Wax Div. Western Petrochemical Corp. | Wax-like polymer |
| RDX | NWS/Yorkton | 1,3,5-trinitro-1,3,5-triazacyclohexane |
| ROCK FT Wax | International Wax Refining Co., Inc. | Natural-product wax, MP 210° F, acid number 0.0, saponification value 0.0 |
| RTV-7 | General Electric Co. | Silicone rubber foam |
| RTV-511 | General Electric Co. | Thermal insulating acrospace silicone rubber |
| RTV-560 | General Electric Co. | Thermal insulating acrospace silicone rubber |
| R630 | Union Carbide Corp. | 60 wt % silicone resin dissolved in Xylene, used in heat-resistant enamels which can withstand temperaures up to 1500° F |
| R-631 | Union Carbide Corp. | 60 wt % silicone resin dissolved in Xylene, Xylene, used in heat-resistant enamels which can withstand temperatures up to 1500° F |
| S-trithiane | Aldrich Chem. Co. | $(CH_2S)_3$, MP 421° F, white solid material with slight odor |
| TNT | NWS/Yorktown | Trinitrotoluene |
| Tricresyl Phosphate | Stauffer Chem. | $C_{21}H_{21}O_4P$, a flame-retardant plasticizer |
| CARSTAB DSTDP | Cincinnati Milacron Chemicals, Inc. | Distearylthiodipropionate, $S(CH_2CH_2CO_2(C_{18}H_{37}))_2$, MP 147° F, acid value 0.2, specific |

-continued

NOMENCLATURE

| Material | Supplier | Description |
|---|---|---|
| D-2 Wax | Hercules | gravity 0.858 84% microcrystalline wax, 14% nitrocellulose, 2% lecithin, used in H-6 explosive |
| Denflex | Dennis Chemical Co. | Polyvinylchloride resin-based plastisol |
| Diphenylamine | Eastman Kodak Co. | $(C_6H_5)_2NH$, MP 129° F |
| Dymerex | Hercules | Natural-product resin |
| Elvax | E.I. DuPont | Proprietary family of resins formed by the copolymerization of ethylene and vinyl acetate to give materials with a wide variety of melting points and polarity |
| Endox 21(T) | Antox, Inc. | Bisphenol-2,2'-methylene-bis-6-t-butyl-4-methylenol, technical grade, MP270° F |
| Endox 22 | Antox, Inc. | Bisphenol-2,2'-methylene-bis-6-t-butyl-4-ethylenol, MP 261° F |
| Ethomid | Armour | Solid hydrogenated tallow amide of general structure, $$\text{O}$$ $RCN(CH_2CH_2O)_xH$. Specific gravity 1.029 |
| Fyrol FR-2 | Stauffer Chem. | Phosphate Plasticizer |
| Fyrol 32B | Stauffer Chem. | Phosphate plasticizer |
| H-6 | NWS/Yorktown | 45% RDX, 30% TNT, 20% aluminum, 5% D-2 wax, 0.5% calcium chloride |
| HMX | NWS/Yorkton | 1,3,5,7-tetranitro-1,3,5,7-tetracyclooctane |
| Iminodiaceto- | Aldrich Chem. Co. | $HN(CH_2CH)_2$, MP 169° F |
| Irgnaox 565 | CIBA-GEIGY | Proprietary, multifunctional, high-molecular-weight, white crystalline free-flowing powder, MP 199° F |
| Irganox 1010 | CIBA-GEIGY | $C(CH_3)_3$ $C\ CH_2O_2CCH_2CH_2\ O-$ $C(CH_{3-3}\ 4$ The sterically hindred phenolic hydroxyl groups provide antioxidant activity while its high molecular weight contributes to low volatility. Remains stable at temperatures in excess of 600° F |
| Irganox 1093 | CIBA-CEIGY | Hindered phenol antioxidant, MP 120° F |
| Kemamine D190 | Humko Products | $RNHCH_2CH_2NH_2$; 1-3 propylenediamine, R=90% arachidyl-behenyl, MP 127° F; product is 88% diamine, iodine value 2.0 max. |
| Kemamine P190 | Humko Products | $RNH_2$; primary amine, R=90%, arachidyl-behenyl, MP 124° F product is 94% primary amine, iodine vaue 2.0 max. |
| Kemamine T1902D | Humko Products | $RC(CH_3)_2$; tertiary amine, distilled, R=90% arachidyl-behenyl; product is 95% tertiary amine |
| Kemamine T9702D | Humko Products | $RN(CH_3)_2$, tertiary amine, distilled, hydrogenated tallow, liquid; product is 95% tertiary amine |
| Melamine | Eastman Kokad Co. | 2,4,6-triamino-s-triazine |
| NASA Type 313 | NASA Ames Research Center | Intumescent paint formed by the ammonium salt of 4-nitroaniline-2-sulfonic acid combined with an epoxy-polysulfide resin |
| Type B Composition | NWC/China Lake | A coating material of 50% hot melt, 40% calcium formate, and 10% sodium formate |
| Wytox 540 | National Polychemicals Inc. | Proprietary polymeric phosphite having high hydrolysis resistance and low volatility: clear, yellow liquid; specific gravity 1.003, acid value (max.) 0.2, 4.05–4.15 wt % phosphorus. |
| 405 Wax | Cincinnati Milacron | Synthetic polyamide, MP 405° F, flash pt. 540° F, COC, * acid value 10 (max.) |
| 440 Wax | Cincinnati Milacron | Synthetic polyamide, MP 440° F, flash pt. 555° F, COC, acid value 10 (max.) |
| 450 Wax | Cincinnati Milacron | Synthric polyamide, MP 450° F, flash pt. 520° F, |

-continued

| NOMENCLATURE | | |
|---|---|---|
| Material | Supplier | Description |
| | | COC, acid value 10 (max.) |

* Acid values in mg KOH/g.
* Cleveland Open Cup Method.

DESCRIPTION OF THE PREFERRED EMBODIMENTS

When ordnance items are exposed to a fire, the temperature of the liner-explosive interface is raised until it reaches a temperature of about 500° F. (260° C.), at which temperature the explosive undergoes a rapid, exothermic, irreversible, decomposition. By a combination of physical and chemical phenomena, this invention extends the time it takes the liner-explosive interface to reach the temperature at which the self-sustaining, irreversible, exothermic decomposition occurs. Specifically, to increase the time it takes for an explosive to cookoff a bomb liner comprising a desensitizing agent incorporated into a matrix support material has been developed. Although many kinds of explosive ordnance may be protected from inadvertent cookoff by the manner disclosed herein, 1,3,5,-trinitro-1, 3, 5,-triazacyclohexane-trinitrotoluene (RDX-TNT) based explosives, better known as H-6 explosives are of particular interest in the present invention.

Compatability is always the major consideration in selecting any material which is either to be admixed with or in contact with an explosive. Thus, to select a viable matrix support material and a viable desensitizing agent, certain stringent compatability criteria must be met. Testing revealed that the RDX-TNT explosive, like other explosives, had certain explosive characteristics which would provide a frame of reference from which to work. These characteristics dictated that the material selected (a) must not interact with the explosive below about 350° F. (177° C.), (b) must absorb a substantial amount of heat between about 350° and about 400° F. (177° and 204° C.), (c) must thermally release the desensitizing agent between about 400° and 500° F. (204° and 260° C.), and (d) must form a protective barrier intermediate the bomb case and the explosive. Furthermore, the desensitizing agent selected must be compatible with the maxtrix support material and the explosive, and be capable of endothermically reacting with the explosive so as to neutralize the initial decomposition products of the RDX.

To insure that the best and most compatible materials were being selected, a series of tests including thermogravimetric analysis (TGA), differential scanning calorimetry (DSC), small bomb cookoff tests, and vacuum stability tests were conducted. In the final analysis it was determined that the bomb liner systems should contain from about 60% to about 70% by weight of a polyvinylchloride resin-based plastisol matrix support material and from about 30% to about 40% by weight of the desensitizing agent S-trithiane. The preferred bomb liner system contained from about 62% to about 68% by weight of the above matrix support material and from about 32% to about 38% by weight of the above desensitizing agent and the most preferred bomb liner comprises about 65 weight percent of a polyvinylchloride resin-based plastisol matrix support material such as DENFLEX and about 35 weight percent of the desensitizing agent S-trithiane.

Comparative experimental information and data for various desensitizing agents and matrix support materials are presented in the following sections. An analysis of this information and data is included to help one skilled in the art understand the significance of the present invention.

DESENSITIZING AGENTS

Candidate desensitizing agents were initially screened by differential scanning calorimetry (DSC) to determine endothermic effect, dynamic thermogravimetric analysis (TGA) to determine weight loss as a function of increasing temperature, and isothermal thermogravimetric analysis to determine weight loss as a function of time.

Endothermic and exothermic reactions of candidate desensitizing agents both by themselves and mixed with various matrix materials were determined using the Perkin-Elmer, Model A, differential scanning calorimeter (DSC). DSC scans were performed for various quantities (0.5 to 3.0 mg) of the H-6 explosive, and the areas of the exotherms were determined. The H-6 explosive was then mixed with candidate desensitizing agents, and DSC scans for the mixture were recorded. The maximum exothermic temperature was noted, and the area under the exothermic decomposition peak determined. Equation (1) was then used to determine the endothermic effect. The significance of the data is twofold. First, the temperature of the exothermic maximum for the H-6 explosive is found to be 500° F. (260° C.). A significant decrease, 20° F. or greater, in the temperature of the exothermic maximum indicates that the liner material would cause the warhead to cookoff prematurely. Second, a positive number for the endothermic effect indicates that the explosive and the liner material are interacting in a heat-absorbing reaction, which is the objective. A value of zero for the endothermic effect indicates that the liner materials had no effect on the decomposition of the explosive. A negative number indicates that the liner material sensitized the explosive, causing it to decompose more energetically than normally. The results of our initial screening of materials are summarized in Table 1.

$$\text{ENDOTHERMIC EFFECT} = \frac{\text{(Area of the H-6 Exotherm)} - \text{(Area of the (H-6 + Liner)(Exotherm)}}{\text{Weight of Liner}} \quad \text{Eq 1}$$

TGAs of the individual desensitizers without the explosive H-6 present were performed to establish the importance of evaporation and sublimation of the desensitizing agents. The weight percents remaining at 392° F. (200° C.), 500° F. (260° C.), and 536° F. (280° C.) for each desensitizer are summarized in Table 2. Except for strithiane, the Kemamines T1902D and P190, sulfur, and Endox 21(T) and 22, all of the desensitizers with a positive endothermic effect lost less than 15% weight at 536° F. (280° C.). The densensitizing agent, s-trithiane, begins to sublime below its melting point, 421° F. (216° C.), and after melting the loss of sample accelerates. The low-temperature-melting Kemamines and the moderate-temperature-melting Endox 21 (T) and 22 boil away. While these changes in the physical state have led to experimental difficulties for these densensitizing agents, other low-temperature melting desensitizing agents, such as CARSTAB DLTDP, have been successfully used.

values for both the endothermic effect and the temperature of the exothermic maxima. Both aliphatic and aromatic amines are unsatisfactory. The closely realted amides are questionable because they either lowered the temperature of exothermic maximum by 22° F. (Acrawax) or they show no positive endothermic effect (Ethomid and Armslip CP).

The third general class of desensitizing agents are the hindered phenols. Irganox 565 and 1010 both gave fa- Table 1
Endothermic Effect and Dynamic Thermogravimetric Analysis of Individual Antioxidants and Waxes

| Compound | Differential Scanning Calorimetry Studies* | | | Thermogravimetric Analysis for the Desensitizer+ | | |
|---|---|---|---|---|---|---|
| | Melting Point (° F) | Endothermic Effect | Temperature of the Exothermic Maximum (° F) | Weight % Remaining At | | |
| | | | | 392° F (200° C) | 500° F (260° C) | 536° F (280° C) |
| CARSTAB DLTDP | 108 | +6.9 | 489 | 100 | 97.6 | 94.5 |
| Kemamine D190 | 127 | +6.9 | 333 | 98.4 | 82.1 | 63.2 |
| WYTOX 540(liquid) | — | +5.6 | 502 | 93.5 | 86.6 | 84.6 |
| Arkon P-115 | 221 | +5.5 | 489 | 100 | 95.4 | 92.7 |
| CARSTAB DMTDP | 120 | +4.8 | 493 | 99.0 | 96.8 | 94.2 |
| Irganox 565 | 199 | +3.9 | 500 | 100 | 100 | 98.0 |
| Acrawax | 446 | +3.5 | 473 | 100 | 96.9 | 93.7 |
| S-trithiane | 421 | +3.3 | 500 | 71.0 | 4.5 | 2.5 |
| Kemamine T1902D | — | +3.1 | 399 | 96.0 | 44.0 | 14.0 |
| Sulfur | — | +3.0 | 504 | 98.3 | 85.0 | 72.0 |
| Irganox 1010 | — | +2.8 | 493 | 98.7 | 98.0 | 98.0 |
| Endox 21T | 270 | +2.7 | 469 | 95.5 | 23.0 | 0.7 |
| Rock Wax | — | +2.0 | 534 | 100 | 94.9 | 83.8 |
| Kemamine P190 | 124 | +1.0 | 369 | 92.0 | 32.2 | 3.0 |
| Ozokerite Wax | — | +0.8 | 507 | 100 | 96.2 | 86.2 |
| Endox 22 | 261 | +0.6 | 480 | 95.5 | 43.5 | 1.5 |
| Carnaba Wax | 200 | +0.6 | 493 | 99.6 | 96.2 | 92.7 |
| Ethomid | — | 0.0 | 500 | 97.7 | 69.7 | 49.1 |
| Kemamine T9702D (liquid) | — | 0.0 | 383 | 95.9 | 46.0 | 14.0 |
| Armoslip CP | 162 | −0.1 | 484 | 97.1 | 68.5 | 40.1 |
| Iminodiacetonitrile | 169 | −0.1 | 485 | 71.5 | 7.0 | 6.0 |
| Irganox 1093 | 120 | −2.1 | 498 | 100 | 99.8 | 99.0 |
| CARSTAB DSTDP | 147 | −2.1 | 493 | 99.2 | 96.7 | 95.3 |
| Polyethylene Wax | — | −2.5 | 500 | 98.6 | 86.0 | 69.7 |
| 4,4'-Azodiphenetole | 320 | −2.6 | 493 | 96.7 | 64.0 | 29.0 |
| 4,4'-Azobis(N,N'-dimethylaniline) | 280 | −4.2 | 439 | 100 | 94.7 | 82.3 |
| Diphenylamine | 129 | −5.8 | 446 | 37.0 | 0.0 | 0.0 |
| Asphaltic Hot Melt | 199 | −44.4 | 529 | 90.0 | 75.0 | 66.0 |

*The DSC scan rate was 40° C/min, and the total sample weight was approximately 5 mg. of which approximately 40% was H-6.
+The TGA scan rate was 20° C/min, and the desensitizer sample weights ranged from 10 to 20 mg. No H-6 explosive was present.

The results summarized in Table 1 show that the desired endothermic effect can be achieved with a variety of compounds. The data also show several interesting trends concerning the relative importance of the functional groups and their reactivity with the H-6 explosive and the melting points of the various desensitizing agents. The three CARSTABs (DLTDP, DMTDP and DSTDP) are all sulfides (-s-), which differ only in the length of the carbon chain of the alcohol function of the carboxylic acid ester and therefore in their in their melting points. All three of these sulfide-type additives showed no significant decrease in the temperature of the exothermic maximum but a marked difference in the endothermic effect, which is inversely related to the melting point. The remaining sulfide, s-trithiane, is a sixmembered, cyclic structure with a high melting point which approximates RDX's melting point and sublimation characteristics. It has proven to be a good desensitizing agent.

The second general class of desensitizing agents are the primary, secondary, and tertiary amines, which are sold under the trade name Kemamines. The apparent favorable endothermic effect of Kemamines P190 and T1902D is misleading because they caused the explosive to begin to degrade at much lower than normal temperatures, as indicated by the temperature of the exothermic maximum. The aromatic amines (4,4'-azobis(N,N'-dimethylaniline and diphenylamine) gave unfavorable vorable results. However, the remaining members of this group (Endox 21(T) and 22, and Irganox 1093) gave either only marginal or unfavorable test results.

The fourth category is waxes, some of which have already been discussed under other classifications and appear promising. Due to the fact that either many of the waxes are based on natural products or their manufacturer regards their structure as proprietary, only limited information is available concerning their structure and functional groups. Several appear promising as either desensitizing agents themselves (Arkon P-115) or as inert support-matrix materials for other densensitizers (Ozokerite Wax, Carnaba Wax, Ethomid, and Armoslip CP). However, all the waxes showed a marked improvement over the asphaltic hot melt, the last entry in Table 1, which is shown to sensitize the H-6 explosive.

DESENTIZING AGENTS MIXED IN SILICONE

RTV RUBBERS AND SILICONE RESINS

Initial efforts to identify suitable methods to formulate interior liners utilized silicone RTV rubbers (560, 511, 7), manufactured by the General Electric Company, and the silicone resin R-631, manufactured by Union Carbide Corporation, as matrix materials for the desensitizing agents. Using the DSC and Equation (1), we determined the endothermic effects and maximum exothermic temperatures (see Table 2).

Dynamic thermogravimetric analyses (dynamic TGA) were performed on the candidate liner and their mixtures with H-6 to establish if (a) the desensitizing agent is released from the silicone rubber or resin matrix; and (b) the desensitizing agent reacts with the H-6 explosive. A heating rate of 20° C./min., was used. Table 3 summarizes the weights remaining at 392° F. (200° C.), 500° F. (260° C.), and 536° F. (280° C.) for the liner formulations by themselves and for mixtures of the liner and H-6 explosive. The last three columns summarize the difference between the theoretical and experimental weight losses. These three temperatures were selected because they are the temperatures at which the rapid exothermic decomposition of H-6 begins, reaches a maximum, and concludes. The last entry in Table 3 gives the data for H-6 by itself. The rapid weight loss of H-6 at 392° F. (200° C.) is due principally to the sublimation and decomposition to gaseous products of the RDX, while the residual weight at the final temperature is due principally to the aluminum, which constitutes 20% of the H-6 formulation. The two entries immediately preceding the data for H-6 are for the silicone RTV rubber, RTV-560, and silicone resin R-631 by themselves.

The data recorded in Table 2 show that the desensitizers, s-trithiane and Irganox 1010 in RTV-560, CARSTAB DLTDP in RTV 7, Table 2.

Endothermic Effect of Desensitizers Mixed in Silicone RTV Rubbers and Silicone Resins

| Antioxidant | Silicone RTV Rubber or Resin | Weight % in the Sample of H-6 | Weight % in the Sample of Antioxidant | Endothermic Effect | Temperature of the Exothermic Maximum (° F) |
|---|---|---|---|---|---|
| S-trithiane* | RTV-560 | 22.05 | 45.30 | +3.53 | 495 |
| Irganox 1010 | RTV-560 | 17.90 | 20.52 | +1.83 | 496 |
| S-trithiane+ | RTV-560 | 35.52 | 6.45 | +0.82 | 501 |
| CARSTAB DLTDP | RTV-7 | 39.35 | 6.07 | +0.34 | 501 |
| $NH_4H_2PO_4$ | RTV-560 | 14.94 | 21.26 | +0.32 | 482 |
| Irganox 565 | RTV-560 | 11.60 | 88.40 | +0.22 | 495 |
| WYTOX 540 | RTV-511 | 41.35 | 5.84 | +0.11 | 502 |
| WYTOX 540 | RTV-7 | 39.39 | 6.05 | −0.16 | 501 |
| CAO 44 | RTV-560 | 19.22 | 20.19 | −0.16 | 494 |
| WYTOX 540 | RTV-560 | 37.81 | 6.21 | −0.50 | 502 |
| $(NH_4)_2HPO_4$ | RTV-560 | 21.67 | 19.58 | −0.50 | 485 |
| Irganox 565 | RTV-560 | 44.00 | 5.55 | −0.51 | 502 |
| Arkon P-115 | RTV-560 | 20.96 | 19.76 | −0.51 | 500 |
| Melamine | RTV-560 | 15.10 | 42.45 | −0.67 | 494 |
| CARSTAB DLTDP | RTV-560 | 8.37 | 22.91 | −0.91 | 494 |
| CARSTAB DLTDP | RTV-560 | 40.17 | 6.00 | −1.08 | 501 |
| Polymekon | R-631 | 20.03 | 19.99 | −1.24 | 498 |
| Iminodiacetonitrile | RTV-511 | 29.18 | 7.08 | −1.35 | 496 |
| Kemamine D190 | RTV-560 | 36.77 | 6.30 | −1.69 | 506 |
| 450 Wax | R-631 | 42.49 | 28.76 | −1.96 | 494 |
| CARSTAB DLTDP | RTV-511 | 43.15 | 5.72 | −2.02 | 500 |
| 450 Wax | RTV-560 | 19.83 | 20.04 | −2.73 | 484 |
| Melamine | R-631 | 36.58 | 31.70 | −2.78 | 484 |
| Polymekon | R-631 | 30.07 | 30.07 | −4.70 | 494 |

*10% s-trithiane in liner.
+25% s-trithiane in liner.

Table 3.

Dynamic Thermogravimetric Analysis for Desensitizers Mixed in Silicone RTV Rubbers And Silicone Resins And for Mixtures of Liners and H-6 Explosive

| Desensitizer | | | Weight Remaining (%) | | | | | | Theoretical less Experimental Weight Loss (wt %) | | |
|---|---|---|---|---|---|---|---|---|---|---|---|
| | | | Liner Alone | | | Liner and H-6 | | | | | |
| Name | % in Liner | RTV or Resin | 392° F (200° C) | 500° F (260° C) | 536° F (280° C) | 392° F (200° C) | 500° F (260° C) | 536° F (280° C) | 392° F (200° C) | 500° F (260° C) | 536° F (280° C) |
| Irganox 1010 | 25 | RTV-560 | 99.0 | 98.0 | 97.5 | 96.0 | 88.9 | 87.8 | −4.81 | −1.65 | −1.16 |
| S-trithiane | 10 | RTV-560 | 95.1 | 93.1 | 92.7 | — | — | — | — | — | — |
| S-trithiane | 25 | RTV-560 | 87.9 | 75.8 | 75.4 | 79.5 | 69.0 | 68.5 | +2.94 | +0.30 | +0.28 |
| S-trithiane | 50 | R-631 | 59.5 | 47.8 | 46.9 | 62.5 | 47.0 | 46.5 | −4.03 | −1.11 | −1.54 |
| Irganox 565 | 10 | RTV-560 | 99.5 | 98.5 | 97.9 | — | — | — | — | — | — |
| WYTOX 540 | 10 | RTV-560 | 99.5 | 97.4 | 96.9 | — | — | — | — | — | — |
| WYTOX 540 | 10 | RTV-7 | 98.3 | 94.4 | 92.1 | — | — | — | — | — | — |
| CARSTAB DLTDP | 10 | RTV-560 | 99.5 | 98.4 | 97.4 | — | — | — | — | — | — |
| CARSTAB DLTDP | 10 | RTV-7 | 99.0 | 95.8 | 92.7 | — | — | — | — | — | — |
| CARSTAB DLTDP | 10 | RTV-511 | 99.6 | 98.7 | 98.3 | — | — | — | — | — | — |
| Kemamine D-190 | 10 | RTV-560 | 99.5 | 96.5 | 94.4 | — | — | — | — | — | — |
| 450 Wax | 25 | RTV-560 | 99.0 | 97.9 | 97.8 | 90.0 | 86.3 | 85.2 | +1.21 | +0.90 | +1.72 |
| 450 Wax | 50 | R-631 | 96.6 | 94.5 | 92.5 | 92.5 | 82.0 | 79.8 | −4.05 | +1.31 | +1.65 |
| CAO 44 | 25 | RTV-560 | 99.2 | 96.2 | 89.0 | 88.6 | 85.0 | 80.1 | −3.06 | +1.14 | −0.23 |
| CAO 44 | 50 | R-631 | 98.0 | 96.5 | 93.5 | 95.0 | 89.8 | 88.4 | −2.56 | −0.94 | −2.33 |
| Melamine | 25 | RTV-560 | 98.8 | 90.5 | 86.0 | 82.9 | 75.1 | 71.2 | +4.45 | +1.36 | +1.54 |
| Melamine | 50 | R-631 | 100.0 | 98.9 | 95.8 | 93.5 | 84.2 | 77.0 | −1.91 | +3.21 | +7.63 |
| Polymekon | 25 | RTV-560 | 99.9 | 96.2 | 94.8 | 86.0 | 82.3 | 80.6 | +3.73 | −3.18 | +0.86 |
| Polymekon | 50 | R-631 | 98.0 | 92.8 | 86.2 | 86.5 | 80.0 | 77.1 | −1.44 | −2.00 | −4.39 |
| $NH_4H_2PO_4$ | 25 | RTV-560 | 98.2 | 95.0 | 93.8 | 96.2 | 86.3 | 85.5 | −6.74 | −2.98 | −3.38 |
| $(NH_4)_2HPO_4$ | 25 | RTV-560 | 97.0 | 93.5 | 93.0 | 94.5 | 82.0 | 81.2 | −7.55 | −1.96 | −1.81 |
| Arkon P115 | 25 | RTV-560 | 99.3 | 96.8 | 96.4 | 99.0 | 91.0 | 89.0 | −6.99 | −1.12 | −2.34 |
| None | 0 | RTV-560 | 99.0 | 97.9 | 97.0 | — | — | — | — | — | — |
| None | 0 | R-631 | 99.0 | 97.2 | 96.5 | — | — | — | — | — | — |

Table 3.-continued
Dynamic Thermogravimetric Analysis for Desensitizers Mixed in Silicone RTV Rubbers
And Silicone Resins And for Mixtures of Liners and H-6 Explosive

| Desensitizer | | | Weight Remaining (%) | | | | | | Theoretical less Experimental Weight Loss (wt %) | | |
|---|---|---|---|---|---|---|---|---|---|---|---|
| | | | Liner Alone | | | Liner and H-6 | | | | | |
| Name | % in Liner | RTV or Resin | 392° F (200° C) | 500° F (260° C) | 536° F (280° C) | 392° F (200° C) | 500° F (260° C) | 536° F (280° C) | 392° F (200° C) | 500° F (260° C) | 536° F (280° C) |
| None | 0 | None | — | — | — | 50.7 | 31.5 | 30.3* | — | — | — |

*H-6 alone.

ammonium phosphate and Irganox 565 in RTV 560, and WYTOX 540 in RTV 511 all gave favorable endothermic effects; and the remaining formulations gave unsatisfactory endothermic effects. Except for s-trithiane, a marked decrease in the endothermic effect is noted for the formulations relative to the performance of the desensitizers by themselves (Table 2). The remaining formulations gave unsatisfactory endothermic effects. All entries in Table 2 had acceptable temperaures of the exothermic maximum.

The various formulations, together with their weight-loss data (dynamic TGA), are arranged in the same order in Table 3 as they appear in Table 2. The last entry in Table 3 shows that H-6 has a significant weight loss even at 392° (200° C.) indicating that the desensitizing agent should be available for reaction with the decomposition products of the explosive at 392° F. (200° C.). The two entries immediately above H-6 are for a typical silicone RTV rubber, RTV-560, and resin, R-631, by themselves. Both show minimal weight loss over the entire temperature range.

From examination of the data for the liner formulation by themselves, the following observations are important: (a) using the RTV rubbers, 25% desensitizer is the maximum quantity which could be incorporated into the formulation, but using the silicone resin, 50% of the desensitizer could be easily incorporated into the liner formulation; and (b) the weight loss of the desensitizer s-trithiane equaled the weight of this desensitizer in the original formulation. For mixtures of the candidate liner material and H-6, comparisons are made by examining the differences between the theoretical and experimental data which are listed in the last three columns. A negative value indicates that the liner/H-6 mixture experienced a greater weight loss than the liner and explosive by themselves. In all cases, a greater weight loss was observed for a particular desensitizer when it was incorporated into R-631 resin than when it was incorporated into RTV-560 rubber. Therefore, from the data presented in Tables 2 and 3, one would expect the best cookoff performance from the 50% s-trithiane in R-631 liner formulation.

To screen these formulations for possible problems associated with long-term storage, vacuum desiccator tests (Table 4), and isothermal TGAs (Table 5) were conducted. Vacuum desiccator samples (0.1 g H-6 + 0.4 g liner) were heated to 212° F. (100° C.) under vacuum (approximately 15 torr) for 60 hours. Evidence of chemical and physical changes of liner formulations by themselves, for H-6 by itself, and for the various mixtures of explosive and liner formulation was noted for samples weighed before and after testing. From the weight losses for the individual liner formulation and H-6, and from the initial composition of the mixtures, an expected weight loss was calculated for each mixture, i.e., column labeled Expected. The experimental weight loss was subtracted from the expected values, and the results were recorded in the column labeled Difference. A positive value listed in the difference column and the absence of evidence of reaction between the explosive and liner material would support a claim for long-term storage compatibility between the explosive and liner formulations.

Table 4
Vacuum Desiccator Tests For Desensitizers Mixed in Silicone RTV Rubbers and Silicone Resins

| Desensitizer | | | | | | Weight Loss (wt %) | | | |
|---|---|---|---|---|---|---|---|---|---|
| Name | % in Liner | RTV or Resin | wt % in Sample of | | | | | | |
| | | | H-6 | Desensitizer | Expected | Expermiental | Difference | Observations+ | |
| Irganox 1010 | 25 | RTV-560 | 28.10 | 17.98 | 2.22 | 2.27 | −0.05 | NC | |
| S-trithiane | 10 | RTV-560 | 25.33 | 7.47 | 1.67 | 6.71 | −5.04 | NC | |
| | 25 | RTV-560 | 18.23 | 20.44 | 2.37 | 5.59 | −3.22 | ED,S | |
| | 50 | RTV-560 | 21.95 | 39.02 | 3.59 | 6.87 | −3.28 | ED,S | |
| | 50 | R-631 | 34.92 | 32.54 | 8.24 | 8.34 | −0.10 | S | |
| | 75 | R-631 | 34.37 | 49.22 | 6.82 | 8.17 | −1.35 | S | |
| Irganox 565 | 10 | RTV-560 | 24.89 | 7.51 | 1.18 | 1.20 | −0.02 | NC | |
| | 25 | RTV-560 | 24.08 | 18.98 | 1.74 | 1.60 | +0.14 | ED,DD | |
| | 75 | R-631 | 24.91 | 56.32 | 3.24 | 2.06 | +1.18 | DD | |
| WYTOX 540 | 10 | RTV-560 | 26.97 | 7.30 | 2.14 | 8.48 | −6.34 | DD | |
| | 10 | RTV-7 | 29.55 | 7.04 | 1.84 | 5.05 | −3.21 | DD | |
| | 10 | RTV-511 | 17.42 | 8.26 | 0.92 | 1.62 | −0.70 | DD | |
| | 75 | R-631 | 19.07 | 60.70 | 5.95 | 7.05 | −1.11 | DD | |
| CARSTAB DLTDP | 10 | RTV-560 | 19.49 | 8.05 | 0.92 | 0.77 | +0.15 | S | |
| | 10 | RTV-7 | 25.56 | 7.44 | 1.23 | 1.09 | +0.14 S | | |
| | 10 | RTV-511 | 22.86 | 7.71 | 1.04 | 0.11 | +0.93 | S | |
| | 25 | RTV-560 | 15.48 | 21.13 | 1.18 | 0.47 | +0.71 | ED,S | |
| Kemamine D190 | 10 | RTV-560 | 34.43 | 6.50 | 1.63 | 2.36 | −0.73 | R,MD | |
| 450 Wax | 25 | RTV-560 | 18.41 | 20.40 | 1.51 | 1.60 | −0.09 | ED,DD | |
| | 50 | R-631 | 16.32 | 41.74 | 1.91 | 20.3 | −0.12 | ED,DD | |
| Endox 22 | 25 | RTV-560 | 25.72 | 18.57 | 2.00 | 1.72 | +0.28 | R | |
| Endox 21(T) | 25 | RTV-560 | 26.67 | 18.33 | 2.08 | 1.73 | +0.35 | ED | |
| CAO-44 | 25 | RTV-560 | 18.69 | 20.33 | 1.52 | 1.86 | −0.34 | ED | |
| | 50 | R-631 | 15.98 | 42.01 | 1.86 | 2.22 | −0.36 | ED | |
| | 75 | R-631 | 17.18 | 62.11 | 3.23 | 2.63 | +0.60 | ED | |
| Melamine | 25 | RTV-560 | 25.48 | 18.63 | 2.02 | 2.55 | −0.53 | ED | |
| | 50 | R-631 | 16.08 | 41.96 | 1.83 | 2.01 | −0.18 | MD,ED,DD | |
| Polymekon | 25 | RTV-560 | 27.80 | 18.05 | 2.08 | 2.77 | −0.69 | ED | |

Table 4-continued

Vacuum Desiccator Tests For Desensitizers Mixed in Silicone RTV Rubbers and Silicone Resins

| Desensitizer | | | wt % in Sample of | | Weight Loss (wt %) | | | |
|---|---|---|---|---|---|---|---|---|
| Name | % in Liner | RTV or Resin | H-6 | Desensitizer | Expected | Experimental | Difference | Observations+ |
| | 50 | R-631 | 13.77 | 43.12 | 1.66 | 1.78 | −0.12 | DD |
| NH$_4$H$_2$PO$_4$ | 25 | RTV-560 | 22.60 | 19.35 | 1.82 | 2.33 | −0.51 | ED,R |
| (NH$_4$)$_2$HPO$_4$ | 25 | RTV-560 | 17.62 | 20.60 | 1.44 | 3.07 | −1.63 | ED |
| Arkon P115 | 25 | RTV-560 | 23.73 | 19.05 | 1.96 | 1.93 | +0.03 | ED |
| None | | R-631 | 22.25 | 0.00 | 2.61 | 1.49 | +1.12 | NC |
| None | | PVC* | 10.54 | 0.00 | 1.24 | 1.50 | −0.26 | NC |
| None | | AHM* | 32.56 | 0.00 | 0.99 | 0.36 | +0.63 | NC |

*PVC is a polyvinyl chloride resin based plastisol whose trade name is Denflex; AHM is asphaltic hot melt.
+S, sublimation of the desensitizer; ED, discoloration of the explosive H-6; DD, discoloration of the desensitizer; R, apparent reaction between explosive and liner as indicated by the formation of a new liquid phase, residue etc.; MD, melting of liner; NC, no changes observed in either liner or explosive.

Table 5.

Isothermal TGA of Mixtures of Silicone Rubber and Resin-Based Liner Formulations and H-6 Explosive*

| Desensitizer | | | | wt % Remaining After | | | | | |
|---|---|---|---|---|---|---|---|---|---|
| Name | % In Liner | RTV or Resin | % H-6 in Sample | 0.5 hr | 1 hr | 2 hr | 8 hr | 16 hr | 24 hr |
| S-trithiane | 10 | RTV-560 | 14.41 | 95.8 | 92.0 | 91.0 | 90.5 | 90.0 | 90.0 |
| | 25 | RTV-560 | 7.90 | 90.3 | 85.3 | 83.7 | 77.7 | 76.0 | 76.0 |
| Irganox 565 | 10 | RTV-560 | 14.4 | 99.2 | 98.3 | 98.3 | 98.3 | 98.3 | 98.3 |
| WYTOX 540 | 10 | RTV-560 | 3.42 | 98.5 | 98.0 | 98.0 | 98.0 | 98.0 | 98.0 |
| | 10 | RTV-7 | 9.71 | 98.8 | 98.3 | 98.3 | 98.2 | 98.2 | 98.0 |
| | 10 | RTV-511 | 8.47 | 98.7 | 98.0 | 97.0 | 96.4 | 95.7 | 95.7 |
| CARSTAB DLTDP | 10 | RTV-560 | 13.88 | 99.8 | 99.2 | 99.2 | 99.2 | 99.2 | 99.2 |
| | 10 | RTV-7 | 15.46 | 97.3 | 95.2 | 94.5 | 94.5 | 94.5 | 94.5 |
| | 10 | RTV-511 | 9.43 | 97.7 | 98.4 | 98.2 | 98.2 | 98.2 | 98.2 |
| | 25 | RTV-560 | 11.57 | 95.3 | 94.2 | 93.8 | 90.8 | 90.0 | 90.0 |

*Temperature was held at 212° F (100° C).

Conversely, a negative value in the difference column and/or observations of ED (discoloration of the explosive) or R (apparent reaction between explosive and liner as indicated by the formation of a new liquid phase, residue, etc.) would indicate possible long-term storage problems. Possible compatibility problems were indicated for the following formulations: s-trithiane/RTV-560; Irganox 565/RTV-560 (25 and 75%); CARSTAB DLTDP/RTV-560; 450 wax/RTV-560; 450 wax/R-631; Endox 22/RTV-560; Endox 21T/RTV-560; CAO 44/R-361; Polymekon/RTV-560; Polymekon/R-631; both mono- and dibasic ammonium phosphate RTV-560; and Arkon P115/RTV-560.

Table 5 records the weight loss for mixtures of various liner formulations based on silicone RTV rubbers and the explosive H-6 at six time intervals. The large weight losses, 10 and 24%, for 10 and 25% s-trithiane, respectively, support the data for this formulation in Table 4. For the 25% s-trithiane, evidence of sublimation and explosive discoloration was noted, but no change was noted for the 10% s-trithiane formulation. Where large quantities of s-trithiane are available, evidence of sublimation and reaction with the explosive are observed.

Favorable long-term compatibility results were obtained for the following formulations: Irganox 1010/RTV-560, s-trithiane/R-631; Irganox 565/RTV-560 (10%); Irganox 565/R-631; and CARSTAB DLTDP in combination with RTV-7 or RTV-511. However, two of the desensitizers (s-trithiane and CARSTAB DLTDP) sublimed out of the mixture. This problem was partially alleviated by using the R-631 silicone resin, as shown by the data for the s-trithiane-based formulations. The preference for R-631 resin is also supported by the favorable weight-loss results listed in Table 3.

DESENSITIZERS MIXED IN WAXES

Table 6 summarizes the experimental data for mixtures of antioxidants and waxes. The endothermic effect for several mixtures containing the desensitizers, Kemamine P-190, Wytox 540, and CARSTAB DLTDP, and the waxes, Amprol 23 and polyethylene wax, are satisfactory (greater than zero) and are of the same order of magnitude as the data for the individual desensitizers (Table 1). However, all the mixtures with the most favorable endothermic effects (greater than +3.0) displayed either unfavorable or two maximum exothermic temperatures and, therefore, were judged unacceptable for hardware applications.

When attempts were made to line the small pipe bombs with these formulations by melting and then pouring the molten liner into the pipe bombs, several displayed cracks in the liner due to the greater density of the solid phase compared to the liquid phase. Therefore, modern hot melts, which contain resins and plasticizer as well as the waxes and desensitizers, are required for hardware application.

MODERN HOT-MELT AND PLASTISOL TECHNOLOGY

Modern hot-melt technology is simple and relatively inexpensive. The same equipment which is currently being used by the Navy for the application of the asphaltic hot melt to bomb interiors Table 6.

Endothermic Effect of Antioxidants Mixed in Waxes

| Antioxidant Name | Wt | Wax | Weight % of H-6 | Endothermic Effect | Temperature of the Exothermic Maximum (° F) |
|---|---|---|---|---|---|
| Kemamine P-190 | 12 | Amprol 23 | 45.63 | +7.2 | 387 |

Table 6.-continued

Endothermic Effect of Antioxidants Mixed in Waxes

| Antioxidant Name | Wt % | Wax | Weight % of H-6 | Endothermic Effect | Temperature of the Exothermic Maximum (° F) |
|---|---|---|---|---|---|
| WYTOX 540 | 12.29 | Polyethylene Wax | 43.56 | +5.7 | 464,495 |
| Kemamine P-190 | 12.35 | Polyethylene Wax | 44.55 | +4.6 | 410,484 |
| WYTOX 540 | 12.36 | Amprol 23 | 44.72 | +3.1 | 441,487 |
| CARSTAB DLTDP | 12.34 | Polyethylene Wax | 44.27 | +1.6 | 484 |
| WYTOX 540 | 12.36 | Rock Wax | 44.70 | +1.2 | 491 |
| CARSTAB DLTDP | 12.34 | Arkon P-115 | 44.42 | +0.7 | 488 |
| CARSTAB DLTDP | 12.34 | Rock Wax | 44.32 | +0.5 | 482 |
| CARSTAB DLTDP | 11.13 | Ozokerite Wax | 66.55 | −0.1 | 502 |
| CARSTAB DLTDP | 12.34 | Amprol 23 | 44.35 | −0.2 | 489 |
| Kemamine P-190 | 12.38 | Rock Wax | 45.09 | −3.6 | 417,473 |
| Kemamine P-190 | 12.32 | Ozokerite Wax | 43.97 | −6.0 | 496 |

*Two maximum exotherms were observed where two temperatures are cited.

can be used with these new formulations. The new formulations are composed of a desensitizer, resins to provide toughness and adhesion, and plasticizers to provide fluidity. Modern plastisols are dispersions of a resin, usually polyvinyl chloride, in a plasticizer such as a sebacate, adipate, or azelate ester or tricresyl phosphate. A variety of extenders, fillers, and coloring agents can be added to the basic plastisol formulations. For the present application, we have added desensitizers.

To evaluate candidate formulations and their individual ingredients, we expanded the basic endothermic effect experiment Equation (1), and used the DSC in both a dynamic and isothermal mode of operation. In the dynamic mode, both 40° C./min., and 80° C./min., scan rates were used. An exothermic decomposition of H-6 began at approximately 400° F. (205° C.) and achieved maximum heat release at 484° F. (251° C.) and 511° F. (266° C.), respectively, for the two scan rates. Integration of the area under the curve gave an average experimental heat of decomposition of 280 cal/g of H-6 sample sizes between 1.5 and 3.0 mg.

The various hot melt and plastisol components were mixed with an equal weight of H-6, and the heat of decomposition of H-6 again was determined. To facilitate the testing, some components were compounded with R-631 resin, which is chemically inert. Table 7 summarizes the net change in the heats of decomposition for the dynamic mode and for the isothermal mode. For the isothermal mode, we repeated the above procedure except that we scanned from room temperature to 441° F. (227° C.) and then switched the DSC to the isothermal mode. The exothermic decomposition of the H-6 had begun and released sufficient heat to sustain the decomposition of the explosive. The experimental heat of decomposition was 184 cal/g H-6. Due to the smaller heat release, a larger sample (6–8 mg) could be used to determine the changes in the heats of decomposition. The data presented in Table 7 is in agreement with the data presented in Tables 2 and 3 in the Melamine and Polymekon Wax previously gave unfavorable results. With respect to s-trithiane, the unfavorable results listed in Table 7 together with data from Tables 1, 2, and 3 confirm that the characteristics of the matrix material are important in determining the applicability of s-trithiane formulations as interior liners. The apparent discrepancies in the experimental results are probably associated with the tendency of the compound to sublime, which is particularly apparent in Table 3 data. Similar discrepancies are noted for the antioxidant CAO 44 and 450 Wax, i.e., favorable results when combined with R-631 (Table 4) but unfavorable results when combined with RTV-560 (Table 2). These apparent discrepancies can best be resolved by the small-bomb cookoff tests. The remaining entries in Table 7 all gave favorable results and are representative of the basic constituents for both modern hot melt and plastisol.

Table 8 summarizes the data for dynamic TGA experiments. Compared to the results recorded in Table 3 for formulations based on RTV-560 and R-631 silicone rubbers and resins, the experimental Table 7.

Net Changes in Heats of Decomposition for Modern Hot Melts and Plastisols in Mixture of Equal Weight of H-6

| Desensitizer | | Dynamic Mode Maximum Exothermic Temperature (° F) | | Isothermal Mode Start Of Exotherm (° F) | Net Change in Heat of Decomposition+(%) | |
|---|---|---|---|---|---|---|
| Name | Type | 40° C/min* | 80° C/min* | | Dynamic Mode | Isothermal Mode |
| 100 wt % | | | | | | |
| Denflex | Plastisol | 480 | | 441 | | −58 |
| Dymerex | Resin | 484 | | | −45 | |
| Pentalyn C | Resin | 493 | | | −42 | |
| Fyrol 32B | Plasticizer | 487 | | | −36 | |
| Elvax | Co-polymer of ethylene-vinyl acetate | | | | −35 | |
| 50 wt % in R-631 Resin | | | | | | |
| 450 Wax | Wax | 484 | 504 | 419 | −32 | −39 |
| Fyrol FR-2 | Plasticizer | 441 | | | −24 | |
| CAO 44 | Antioxidant | 484 | 507 | 392 | −13 | −24 |
| S-trithiane | Antioxidant | 484 | 509 | 392 | +19 | +37 |
| Polymekon | Wax | 486 | 513 | 342 | +36 | +104 |
| Melamine | Antioxidant | 459 | 487 | 369 | +43 | +30 |

*Heating rate.
+A negative value for the net change in the heat of decomposition indicates that less heat was released to the environment; therefore a desirable interaction between the explosive and desensitizer occurred.

Table 8.

TGA for Modern Hot Melt and Plastisol Formulations and for Mixtures of Liner and H-6 Explosive

| Linear Composition | | Thermogravimetric Analysis, wt % Remaining for | | | | | | wt % | Theoretical Less Experimental wt % for | | |
|---|---|---|---|---|---|---|---|---|---|---|---|
| | | Line Formulations | | | Line plus H-6 | | | H-6 in | | | |
| Ingredient | % | 392° F (200° C) | 500° F (260° C) | 536° F (280° C) | 392° F (200° C) | 500° F (260° C) | 536° F (280° C) | Sample | 392° F (200° C) | 500° F (260° C) | 536° F (280° C) |
| Elvax | 38 | — | — | — | — | — | — | — | — | — | — |
| Dymerex | 30 | — | — | — | — | — | — | — | — | — | — |
| Tricresyl Phosphate | 10 | — | — | — | — | — | — | — | — | — | — |
| 440 Wax | 22 | 99.0 | 90.5 | 83.9 | 93.0 | 74.5 | 70.2 | 17.5 | −2.45 | +5.68 | +4.32 |
| Elvax | 42 | — | — | — | — | — | — | — | — | — | — |
| CAO44 | 23 | — | — | — | — | — | — | — | — | — | — |
| Dymerex | 13 | — | — | — | — | — | — | — | — | — | — |
| Pentalyn C | 13 | — | — | — | — | — | — | — | — | — | — |
| Fyrol 32B | 9 | 95.8 | 79.0 | 73.0 | 79.0 | 66.2 | 62.8 | 16.4 | +9.40 | +5.01 | +3.20 |
| Denflex | 95 | — | — | — | — | — | — | — | — | — | — |
| Tricresyl Phosphate | 5 | 62.5 | 15.7 | 13.2 | 83.0 | 29.0 | 25.4 | 17.0 | −22.51 | −10.61 | −9.29 |
| Denflex | 72 | — | — | — | — | — | — | — | — | — | — |
| 405 Wax | 24 | 9.40 | 43.0 | 32.8 | 78.2 | 37.4 | 34.0 | 19.0 | +7.57 | +3.42 | −1.68 |
| Denflex | 69 | — | — | — | — | — | — | — | — | — | — |
| CAO44 | 31 | 90.0 | 56.5 | 42.2 | 65.4 | 42.0 | 36.5 | 19.3 | +17.02 | +9.68 | +3.40 |
| Denflex | 65 | — | — | — | — | — | — | — | — | — | — |
| S-trithiane | 35 | 72.0 | 32.6 | 21.8 | 46.0 | 26.2 | 25.0 | 28.0 | +20.04 | +6.09 | −0.82 |
| Asphaltic Hot Melt (Mil-C-3301) | 100 | 100 | 89.5 | 81.8 | 89.5 | 78.4 | 71.8 | 17.3 | +1.97 | +1.07 | +1.09 |
| None | | — | — | — | 50.7 | 31.5 | 30.3 | 100 | — | — | — | weight losses of hot melts and plastisol formulations showed a greater deviation from the theoretical values. The entry immediately above that for H-6, the last entry, is for the currently used asphaltic hot melt. The asphaltic-hot melt/H-6 mixture lost less weight than the theoretical prediction, and the absolute magnitude of the deviations are less than that observed for the first two entries which are modern hot melts. The third through sixth entries are based on the plastisol Denflex. The addition of 405 Wax or the desensitizers CAO 44 or s-trithiane caused a marked change in the weight loss towards a greater sample weight retention at the lower temperatures, compared to the data for modern hot melts, for asphaltic hot melts, and for formulations based on silicone rubbers and resins (Table 3). The marked difference in the performance of the various candidate liners can be expected to cause marked differences in the small-bomb cookoff tests. The basic ingredients and formulations listed in Tables 7 and 8 have been evaluated for use in the small bomb cookoff tests (Table 9).

Ten acceptable formulations are listed in Table 9 together with the results of the laboratory screening experiments and their physical properties. The first, third, fourth, and sixth formulations are based on the commercial plastisol Denflex and may be used either as a modern hot melt or as a plastisol. For use as a plastisol, the desensitizers and/or plasticizers would be added to the fluid Denflex and mixed to form a homogeneous suspension at room temperature. This fluid suspension could then be poured into the bomb casing and the excess drained at room temperature. Heaters could then be inserted inside the bomb casing to 248° F. (120° C.) at which the coating will solidify without the evaporation of a solvent or a chemical curing agent. A second approach is to cause the plastisol formulations to solidify before they are introduced into the ordnance hardware. Continued heating of the solidifying plastisol will cause it to melt, and it can then be poured into the casing at 347° F. (175° C.) using current hot-melt coating methods. The remaining eight formulations are all modern hot melts and after heating to the "Pourable at" temperatures listed in Table 9, they also can be used to coat ordnance hardware using current hot-melt coating methods. The formulations listed at the bottom of Table 9 were judged unacceptable because they were too brittle and cracked, possibly because of the very high weight percentage (60 and 63) of the 440 Wax. The wax content is very important, as shown by the fact that the second formulation containing 50% 440 Wax was found to be an acceptable formulation.

The formulations in Table 9 are ranked in descending order with the most favorable net change in heat of decomposition being listed first. The antioxidant CAO 44 gave very impressive results in that it is a constituent of the first two formulations. This result is in striking contrast to the unfavorable results obtained

Table 9.

Modern Hot-Melt and Plastisol Formulations, Compositions and Properties

| Composition | | Performance | | Physical Properties | |
|---|---|---|---|---|---|
| Ingredients | % | Net Change in Heat of Decomposition (%) | Temperature of the Exothermic Maximum (° F) | Pourable at (° F) | Adhesion |
| Denflex | 57 | — | — | — | — |
| CAO 44 | 38 | — | — | — | — |
| Fyrol FR-2 | 5 | −63 | 489 | 347 | Fair |
| 440 Wax | 50 | — | — | — | — |
| CAO 44 | 30 | — | — | — | — |
| Elvax | 20 | −52 | 478 | 356 | Good |
| Denflex | 80 | — | — | — | — |
| 440 Wax | 16 | — | — | — | — |
| Tricresyl Phosphate | 4 | −47 | 478 | 347 | Fair to Poor |
| Denflex | 82 | — | — | — | — |
| 440 Wax | 9 | — | — | — | — |
| Tricresyl Phosphate | 9 | −43 | 482 | 347 | Fair |
| Elvax | 43 | — | — | — | — |
| CAO 44 | 43 | — | — | — | — |
| Fyrol 32B | 14 | −43 | 486 | 365 | Very Good |

Table 9.-continued
Modern Hot-Melt and Plastisol Formulations, Compositions and Properties

| Composition | | Performance | | Physical Properties | |
|---|---|---|---|---|---|
| Ingredients | % | Net Change in Heat of Decomposition (%) | Temperature of the Exothermic Maximum (° F) | Pourable at (° F) | Adhesion |
| Denflex | 100 | −42 | 476 | 347 | Fair |
| CAO 44 | 70 | — | — | — | — |
| Elvax | 15 | — | — | — | — |
| Fyrol 32B | 15 | −42 | 498 | 329 | Good |
| Elvax | 30 | — | — | — | — |
| Dymerex | 30 | — | — | — | — |
| CAO 44 | 30 | — | — | — | — |
| Fyrol 32B | 10 | −35 | 489 | 356 | Good |
| Elvax | 30 | — | — | — | — |
| Dymerex | 30 | — | — | — | — |
| 440 Wax | 30 | — | — | — | — |
| Tricresyl Phosphate | 10 | −29 | 482 | 329 | Very Good |
| 440 Wax | 50 | — | — | — | — |
| Tricresyl Phosphate | 30 | — | — | — | — |
| Elvax | 20 | −8 | 498 | 356 | Fair |
| 440 Wax* | 60 | — | — | — | — |
| Elvax | 30 | — | — | — | — |
| Tricresyl Phosphate | 10 | — | — | 356 | Poor |
| 440 Wax* | 63 | — | — | — | — |
| Fyrol 32B | 29 | — | — | — | — |
| Flvax | 8 | — | — | 329 | Poor |

*Unacceptable because they were brittle and cracked and therefore were not subjected to laboratory screening tests.

when it was incorporated into the R-631 resin (Tables 4 and 5). The commercial plastisol Denflex also displayed a very creditable performance in that it is a constituent of four of the first six formulations; even the plastisol by itself gave very good laboratory screening results. The formulations which contain Elvax in the absence of the 400 Wax displayed satisfactory laboratory screening results. Except for the second formulation, which contains 30% CAO 44, the performance as well as the physical properties of the formulations which contain 440 Wax diminished with increasing percentage of the 440 Wax. This observation is in agreement with the unfavorable data presented in Tables 2, 3, and 4 for the closely related 450 Wax.

Small-bomb cookoff tests were performed by using the various liner formulations to coat the interior of small pipe bombs, filling the bombs with H-6 explosive, heating the bomb by an electrical heating ribbon, and recording the time heated, time to violent reaction, and type of reaction, i.e., explosion, deflagration, slow burning or no reaction (Table 10). Approximately 18 A from a 208-V electrical, single-phase circuit was applied to the ends of a 9.5-ft. long, 1/8-in.-wide, 0.0056-in.-thick heating ribbon, with resistance of 0.7913/ft, to give a heating rate of 4° F./sec at the interior surface of the steel case. Both a time for which the bomb was heated and a cookoff time are given in Table 10 because in some experiments the heating ribbon burned through the mica used to insulate the exterior of the steel bomb

Small-Bomb Cookoff Tests

| Test Number | Desensitizer Name | % | Matrix Name | % | Heated (min) | (sec) | Cooked Off (min) | (sec) | Reaction* | Liner Weight (lb) |
|---|---|---|---|---|---|---|---|---|---|---|
| 1 | S-trithiane | 35 | Denflex | 65 | 9 | 00 | 9 | 11 | Def | 1.44 |
| 2 | CAO44 | 50 | R-631 | 50 | 5 | 26 | 8 | 17 | Def | 0.446 |
| 3 | 450 Wax | 50 | R-631 | 50 | 7 | 30 | NR | — | NR | 0.590 |
| 4 | Melamine | 50 | R-631 | 50 | 5 | 46 | 5 | 46 | Def | 0.475 |
| 5 | CAO 44 | 31 | Denflex | 69 | 5 | 00 | 5 | 00 | Def | 1.16 |
| 6 | Irganox 565 | 25 | RTV-560 | 75 | 3 | 54 | 4 | 04 | Exp | 0.303 |
| 7 | S-trithiane | 25 | RTV-560 | 75 | 3 | 45 | 3 | 52 | Exp | 0.298 |
| 8 | S-trithiane | 50 | RTV-560 | 50 | 3 | 28 | 3 | 28 | Def-Burn | 0.296 |
| 9 | CARSTAB DLTDP | 25 | RTV-560 | 75 | 3 | 27 | 3 | 27 | Def-Burn | 0.303 |
| 10 | CAO 44 | 28 | Elvax / Dymerex / Pentalyn C / Fyrol | 42 / 13 / 13 / 4 (72) | 3 | 16 | NR | — | NR | 1.140 |
| 11 | S-trithiane | 25 | RTV-560 | 75 | 3 | 04 | 3 | 04 | Burn | 0.132 |
| 12 | WYTOX 540 | 10 | RTV-7 | 90 | 2 | 58 | 2 | 58 | Def | 0.125 |
| 13 | S-trithiane | 25 | Asphaltic Hot Melt | 75 | 2 | 50 | 2 | 50 | Burn | 0.510 |
| 14 | Irganox 1010 | 25 | RTV-560 | 75 | 2 | 47 | 2 | 47 | Def | 0.327 |
| 15 | Arkon P115 | 25 | RTV-560 | 75 | 2 | 47 | 2 | 47 | Def | 0.327 |
| 16 | 450 Wax | 25 | RTV-560 | 75 | 2 | 42 | 2 | 42 | Def | 0.327 |
| 17 | Irganox 1010 | 25 | RTV-560 | 75 | 2 | 38 | 2 | 38 | Def | 0.327 |
| 18 | Melamine | 25 | RTV-560 | 75 | 2 | 38 | 2 | 38 | Exp | 0.327 |
| 19 | CARSTAB DLTDP | 10 | RTV-560 | 90 | 2 | 31 | 2 | 31 | Def | 0.103 |
| 20 | Melamine | 25 | RTV-560 | 75 | 2 | 29 | 2 | 29 | Def | 0.327 |
| 21 | $(NH_4)_2HPO_4$ | 25 | RTV-560 | 75 | 2 | 29 | 2 | 29 | Def | 0.327 |
| 22 | S-trithiane | 10 | Asphaltic Hot Melt | 90 | 2 | 28 | 2 | 28 | Def-Burn | 0.280 |
| 23 | 405 Wax | 24 | Denflex | 76 | 2 | 28 | NR | — | NR | 1.650 |
| 24 | CAO 44 | 25 | RTV-560 | 75 | 2 | 26 | 2 | 26 | Def | 0.327 |
| 25 | None | — | Asphaltic Hot Melt | 100 | 2 | 25 | 2 | 25 | Def | 0.210 |

-continued

Small-Bomb Cookoff Tests

| Test Number | Desensitizer Name | % | Matrix Name | % | Heated (min) | (sec) | Cooked Off (min) | (sec) | Reaction* | Liner Weight (lb) |
|---|---|---|---|---|---|---|---|---|---|---|
| 26 | (NH$_4$)H$_2$PO$_4$ | 25 | RTV-560 | 75 | 2 | 21 | 2 | 21 | Def | 0.327 |
| 27 | Arkon P115 | 25 | RTV-560 | 75 | 2 | 21 | 2 | 21 | Def | 0.320 |
| 28 | Irganox 565 | 10 | RTV-560 | 90 | 2 | 15 | 2 | 15 | Exp | 0.119 |
| 29 | 450 Wax | 25 | RTV-560 | 75 | 2 | 14 | 2 | 14 | Def | 0.327 |
| 30 | Polymekon | 25 | RTV-560 | 75 | 2 | 14 | 2 | 14 | Def | 0.320 |
| 31 | S-trithiane | 10 | RTV-560 | 90 | 2 | 12 | 2 | 12 | Burn | 0.132 |
| 32 | (NH$_4$)$_2$PO$_4$ | 25 | RTV-560 | 75 | 2 | 03 | 2 | 03 | Def | 0.327 |
| 33 | CAO 44 | 25 | RTV-560 | 75 | 2 | 03 | 2 | 03 | Def | 0.319 |

*Def. deflagation; NR, no reaction; Exp, explosion; Def-Burn, a deflagation which tapered off to a slow burn; Burn, a burning reaction.
+Approximate weight of H-6 explosive was 3.0 lb.

or electrical continuity was lost at the solderless connectors. The small bombs were fabricated from pipe nipples 3 inches in diameter and 6 inches long and two threaded caps. Approximately 3 pounds of explosive and from 0.1 to 1.4 pounds of liner material were used to fill the bombs. The thickness of the interior liner ranged from 1/16 to 1/4 inches.

The majority of the cookoff tests resulted in a deflagration as indicated by "Def" in Table 10. Four tests (6, 7, 18, and 28) resulted in a more violent reaction, i.e., an explosion "Exp." Three cookoff tests (11, 13, and 31) resulted in a relatively mild burning, "Burn" reaction; three tests (8, 9, and 22) deflagrated and tapered off to a slow burn, "Def-burn," and three (3, 10, and 23) recorded no reaction, "NR," due to heating-ribbon failure. A description of selected slow (burning) reaction cookoff test involving the desensitizer s-trithiane follows.

The pipe bomb for Test 31, which contained a very thin (1/16-in.) liner coating and a small quantity of desensitizer (0.0132 lb) split down one side. Small fragments of H-6 explosive were found in the vicinity of the test site. Incorporating the S-trithiane (10 weight %) into asphaltic hot melt, Test 22, resulted in a low-order detonation followed by fire and smoke. One end cap blew out and then the explosive burned; flames were observed for 5 minutes. Increasing the s-trithiane to 25 weight percent in the asphaltic hot melt did not produce a signficant improvement in the cookoff time but gave only a mild burning reaction. It appeared that pressure built up inside the pipe bomb, since one cap blew off, and when the hot vapors came in contact with the atmospheric oxygen, a rapid burning occurred, producing an orange-colored smoke. When s-trithiane was increased to 50% and RTV-560 was used as the support matrix (Test 8), both end caps blew off and the explosive burned. A similar sequence of events was observed for the desensitizer CARSTAB DLTDP, Test 9. The remaining tests resulted in either a deflagration (low-order detonation) or no reaction. The pipe bombs which resulted in no reaction were destroyed at the conclusion of the test.

The most successful liner formulation was composed of 35 weight percent s-trithiane in the plastisol Denflex; i.e., a cookoff time of 9 minutes, 11 seconds, was observed. Several important relationships are indicated by the data in Table 10. The addition of the desensitizer s-trithiane and increasing the quantity of asphaltic hot melt improve the cookoff times for the asphaltic hot melt (note Tests 13, 22, and 25). Comparing the cookoff times for 25% s-trithiane/75% hot melt (Test 13) with the 25% s-trithiane/75% RTV-560 (Tests 7 and 11), we see that the latter tests had a longer cookoff time with thinner liners (quantity of material in these liners was one half or less than in the asphaltic hot melt liners). This is consistent with our DSC studies (Table 1), which indicate that the asphaltic hot melt sensitizes the H-6 explosive. Increasing the liner thickness therefore its quantity also increases the cookoff time. Comparing the two 25% s-trithiane/75% RTV-560-lined bombs (Tests 7 and 11), we note 26% increase in the cookoff times by increasing the percentage by weight of liner to explosive from 4.37 to 9.98%. Increasing the percentage of desensitizer in the formulations also improves the cookoff times, as indicated by Tests 2, 5, 24, and 33 for CAO 44 and by Tests 7, 8, 11, and 31 for s-trithiane. The matrix materials, DEnflex and silicone resin R-631, are superior to the silicone rubber RTV-560 as indicated by the first five tests. The experiments where the heater failed (Tests 1, 2, 3, 6, 7, 10, and 23) suggest that the bomb can be heated for approximately 3 minutes, and then, with the removal of the heat source, a violent reaction can be avoided. Finally, in general, the incorporation of a desensitizing agent in the bomb liners increased the cookoff times and is in agreement with our laboratory experiments (Tables 1 through 9).

Before the pipe bombs were loaded with H-6 explosive, the standard vacuum-stability test was performed on mixtures of the experimental liners and H-6 explosive. Table 11 lists four formulations which were rejected and three which were questionable. All the formulations listed in Table 10 passed the vacuum-stability test. The aliphatic amine, Kemamne D190, reacted with the H-6 causing the formulation to be rejected. The silicone rubber, RTV-511, liquified, causing the formulation to be rejected. Iminodiacetonitrile contains the cyano group, and it was feared that it might produce the toxic gas, hydrogen cyanide. Formulations containing the desensitizers Polymekon, 405 Wax, and Melamine Table 11.

| Vacuum-Stability Tests-Rejected or Questionable Formulations | | | | | |
|---|---|---|---|---|---|
| Desensitizer | | Matrix | | Gas Evolved | |
| Name | % | Name | % | (cc/g/24 hr) | Observations |
| Kemamine D-190 | 10 | RTV-560 | 90 | 3.7 | Blackened H-6, oxides of nitrogen. Rejected |
| CARSTAB DLTDP | 10 | RTV-511 | 90 | 0.5 | Surface of liner changed from white to brown; no changes by H-6 observed, oxides of nitrogen, Rejected |
| Kemamine D-190 | 10 | Amp 23 | 90 | 5.6 | Gas evolved exceeded 2.0 cc/g/24 hr. Rejected |

Table 11.-continued

Vacuum-Stability Tests-Rejected or Questionable Formulations

| Desensitizer | | Matrix | | Gas Evolved | |
|---|---|---|---|---|---|
| Name | % | Name | % | (cc/g/24 hr) | Observations |
| Iminodiaceto-nitrile | 25 | RTV-511 | 75 | 0.7 | Fear of hydrogen cyanide gas being evolved at 100° C. The RTV-511 rubber broke down and became liquid. Rejected |
| Iminodiaceto-nitrile | 10 | RTV-511 | 10 | 0.7 | Fear of hydrogen cyanide gas being evolved at 100° C. The RTV-511 rubber broke down and became liquid. Rejected |
| Polymekon | 50 | R-631 | 50 | <2.0 | Questionable because darkening of H-6 was observed |
| 405 Wax | 24 | Denflex | 76 | 0.1 | Questionable because darkening of H-6 was observed |
| Melamine | 50 | R-631 | 50 | <2.0 | Questionable because darkening of H-6 was observed |

It is important to note that Tests 1 through 5, which gave the most favorable cookoff performance, all passed the vacuum-stability test.

were regarded as questionable. This is in general agreement with experimental data reported in Tables 2, 4, and 7 which also indicate that these desensitizers are not suitable.

Thus, it is apparent that there is provided by this invention a bomb liner which comprises a matrix support material and a desensitizing agent.

It is to be understood that what has been described is merely illustrative of the principles of the invention and that numerous arrangements in accordance with this invention may be devised by one skilled in the art without departing from the spirit and scope thereof.

What is new and desired to be secured by Letters Patent of the United States is:

1. A bomb liner intermediate a bomb case and an explosive, which comprises:
    a polyvinyl-chloride resin based plastisol matrix support material; and
    a desensitizing agent s-trithiane, which is compatible and admixed with said matrix support material and capable of endothermically reacting with said explosive.

2. The liner of claim 1 wherein said explosive is a 1, 3, 5-triazacyclohexane/trinitrotoluene based explosive.

3. The liner of claim 2 wherein said liner comprises from about 60 to about 70 weight percent of a polyvinyl-chloride resin based plastisol and from about 30 to 40 weight percent s-trithiane.

4. The liner of claim 3 wherein said liner comprises from about 62 to about 68 weight percent of a polyvinyl-chloride resin based plastisol and from about 32 to about 38 weight percent of s-trithiane.

5. The liner of claim 4 wherein said liner comprises about 65 weight percent of a polyvinyl-chloride resin based plastisol and about 35 weight percent s-trithiane.

* * * * *